(12) United States Patent
Hergeth et al.

(10) Patent No.: US 12,522,252 B2
(45) Date of Patent: Jan. 13, 2026

(54) METHOD AND APPARATUS FOR OPERATING AN AUTOMATED DRIVING FUNCTION OF A VEHICLE

(71) Applicant: Bayerische Motoren Werke Aktiengesellschaft, Munich (DE)

(72) Inventors: Sebastian Hergeth, Munich (DE); Frederik Platten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 268 days.

(21) Appl. No.: 17/792,724

(22) PCT Filed: Dec. 14, 2020

(86) PCT No.: PCT/EP2020/085926
§ 371 (c)(1),
(2) Date: Jul. 14, 2022

(87) PCT Pub. No.: WO2021/144091
PCT Pub. Date: Jul. 22, 2021

(65) Prior Publication Data
US 2023/0047562 A1    Feb. 16, 2023

(30) Foreign Application Priority Data

Jan. 15, 2020    (DE) .................... 10 2020 100 868.6

(51) Int. Cl.
*B60W 60/00*    (2020.01)
*B60W 40/105*    (2012.01)
(Continued)

(52) U.S. Cl.
CPC ...... *B60W 60/0051* (2020.02); *B60W 40/105* (2013.01); *B60W 50/0097* (2013.01);
(Continued)

(58) Field of Classification Search
CPC .......... B60W 60/0051; B60W 40/105; B60W 50/0097; B60W 50/087; B60W 2554/80; B60W 2420/403
See application file for complete search history.

(56) References Cited

U.S. PATENT DOCUMENTS

| 2015/0151757 A1 | 6/2015 | De Bruin et al. |
| 2015/0217807 A1 | 8/2015 | Schumacher et al. |

(Continued)

FOREIGN PATENT DOCUMENTS

| CN | 104520159 A | 4/2015 |
| CN | 104583045 A | 4/2015 |

(Continued)

OTHER PUBLICATIONS

English translation of JP-2019001235-A (Year: 2019).*
(Continued)

*Primary Examiner* — Todd Melton
*Assistant Examiner* — Matthew Ho
(74) *Attorney, Agent, or Firm* — Crowell & Moring LLP

(57) ABSTRACT

A control unit for controlling a driving function of a vehicle is designed to automatically guide the vehicle longitudinally and/or transversely. The control unit is designed to determine that the driver of the vehicle is presently activating or deactivating, and/or intends to activate or deactivate, the driving function. In response thereto, the control unit is additionally designed to cause a manual control intervention produced by the driver of the vehicle in the longitudinal and/or transversal guidance of the vehicle to be at least partly compensated for and/or suppressed prior to the point in time of the activation or deactivation of the driving function in order to adapt the drive behavior of the vehicle (Continued)

during the transition between the manual longitudinal and/or transversal guidance and the automatic longitudinal and/or transversal guidance.

11 Claims, 2 Drawing Sheets

(51) Int. Cl.
*B60W 50/00* (2006.01)
*B60W 50/08* (2020.01)

(52) U.S. Cl.
CPC ..... *B60W 50/087* (2013.01); *B60W 2420/403* (2013.01); *B60W 2554/80* (2020.02)

(56) References Cited

U.S. PATENT DOCUMENTS

| | | |
|---|---|---|
| 2016/0202700 A1 | 7/2016 | Sprigg |
| 2017/0235305 A1 | 8/2017 | Jung et al. |
| 2018/0029640 A1 | 2/2018 | Otto et al. |
| 2018/0173227 A1 | 6/2018 | Mukai et al. |
| 2018/0370546 A1 | 12/2018 | Augst et al. |
| 2019/0171204 A1 | 6/2019 | Jang et al. |
| 2019/0210614 A1 | 7/2019 | Schulz et al. |
| 2019/0276077 A1 | 9/2019 | Itou et al. |
| 2019/0359225 A1 | 11/2019 | Kanoh et al. |
| 2020/0089225 A1* | 3/2020 | Sadakiyo ............ B60W 30/02 |
| 2020/0239071 A1* | 7/2020 | Lenneman .......... B62D 15/029 |
| 2021/0061313 A1* | 3/2021 | Kim .................... B60W 10/20 |
| 2021/0269089 A1 | 9/2021 | Kuenzner |

FOREIGN PATENT DOCUMENTS

| | | | |
|---|---|---|---|
| CN | 108202743 A | | 6/2018 |
| DE | 10 2016 203 395 A1 | | 9/2017 |
| DE | 10 2018 200 388 A1 | | 7/2019 |
| DE | 11 2017 007 113 T5 | | 10/2019 |
| DE | 10 2018 210 320 A1 | | 1/2020 |
| EP | 3 498 556 A1 | | 6/2019 |
| JP | 10-309960 A | | 11/1998 |
| JP | 2019001235 A | * | 1/2019 |
| JP | 2019043175 A | * | 3/2019 |

OTHER PUBLICATIONS

English translation of JP-2019043175-A (Year: 2019).*
International Search Report (PCT/ISA/210) issued in PCT Application No. PCT/EP2020/085926 dated May 14, 2021 with English translation (six (6) pages).
German-language Written Opinion (PCT/ISA/237) issued in PCT Application No. PCT/EP2020/085926 dated May 14, 2021 (six (6) pages).
German-language Search Report issued in German Application No. 10 2020 100 868.6 dated Jul. 22, 2020 with partial English translation (11 pages).
Chinese-language Office Action issued in Chinese Application No. 202080092525.6 dated Feb. 13, 2025 with partial English translation (24 pages).
Chinese-language Search Report issued in Chinese Application No. 2020800925256 on May 30, 2025 (2 pages).

* cited by examiner

METHOD AND APPARATUS FOR OPERATING AN AUTOMATED DRIVING FUNCTION OF A VEHICLE

BACKGROUND AND SUMMARY

The invention relates to a vehicle having at least one driving function for automated longitudinal and/or lateral control of the vehicle. In particular, the invention relates to a method and a corresponding control unit for operating a driving function of a vehicle.

A vehicle can have one or more driving functions, in particular one or more driver assistance functions, which are designed to longitudinally and/or laterally control the vehicle in an at least semiautomated manner. One example of a driving function is an adaptive and/or active cruise control (ACC), which is designed to regulate the driving speed of the vehicle to a specific target speed. A further example is a lane keeping assistant, which is designed to keep the vehicle in an automated manner on a lateral target location, in particular in the middle, within a lane.

During the activation and/or during the deactivation of a driving function, a transition can occur between the manual longitudinal and/or lateral control and the automated longitudinal and/or lateral control of the vehicle, which can be perceived as uncomfortable by a user of the vehicle. The present document relates to the technical object of increasing the level of comfort during the activation and/or during the deactivation of a driving function for automated longitudinal and/or lateral control of a vehicle.

The object is achieved by each of the independent claims. Advantageous embodiments are described, inter alia, in the dependent claims. It is to be noted that additional features of a claim dependent on an independent claim, without the features of the independent claim or only in combination with a subset of the features of the independent claim, can form a separate invention independent of the combination of all features of the independent claim, which can be made the subject matter of an independent claim, a divisional application, or a subsequent application. This applies in the same manner to technical teachings described in the description, which can form an invention independent of the features of the independent claims.

According to one aspect, a control unit for controlling a driving function, in particular a driver assistance function, of a (motor) vehicle is described. The driving function is designed to longitudinally and/or laterally control the vehicle in an automated manner. The driving function can be designed according to SAE level 1 or higher. The driving function can comprise a cruise control, an adaptive cruise control, and/or a lane keeping assistant.

The control unit can be configured to determine that the driver of the vehicle is about to and/or intends to activate the driving function or deactivate the driving function. The activation or the deactivation can be effectuated, for example, by actuating (in particular by touching or by pressing) an operating element. The control unit can therefore be configured to recognize that the driver intends and/or is about to actuate (or is on the verge of actuating) the operating element to activate or to deactivate the driving function. This situation can be recognized chronologically before the actual activation or deactivation point in time of the driving function (in particular chronologically before the actuation of the operating element).

It can thus be recognized that the driver of the vehicle therefore focuses on activating or deactivating the driving function, and the driver of the vehicle will (probably) activate or deactivate the driving function at a following activation or deactivation point in time. This can be recognized, for example, in a time period of one second or more or of 2 seconds or more before the actual activation or deactivation point in time.

When the driver of the vehicle focuses on the activation or deactivation of the driving function, this can thus result in reduced attentiveness of the actual (manual) driving task or a higher level of cognitive stress and thus a reduction of the cognitive resources available for the driving task. In particular, this can result in an incorrect manual control intervention in the longitudinal and/or lateral control.

The activation of the driving function can be designed to cause, starting from the (possibly solely and/or completely) manual longitudinal and/or lateral control of the vehicle by the driver, an automated longitudinal and/or lateral control by the driving function from the (chronologically subsequent) activation point in time of the driving function. In a corresponding manner, the deactivation of the driving function can be designed to manually (possibly completely) longitudinally and/or laterally control the vehicle from the (chronologically subsequent) deactivation point in time of the driving function.

The driving function can be designed to set at least one driving variable of the vehicle to a target value, in particular to regulate it to the target value. Exemplary driving variables are: the driving speed of the vehicle (in particular in the driver assistance function ACC); the distance of the vehicle to a front vehicle driving in front of the vehicle (in particular in the driver assistance function ACC); and/or the lateral location or the transverse location of the vehicle within the lane traveled by the vehicle (in particular with a lane keeping assistant).

The activation of the driving function can be designed to pass from a (possibly solely or completely) manual setting of the (actual) value of the driving variable by the driver to a (possibly completely) automated setting of the value of the driving variable by the driving function. In a corresponding manner, the deactivation of the driving function can be designed to pass from a (possibly solely or completely) automated setting of the value of the driving variable by the driving function to a (possibly completely) manual setting of the value of the driving variable by the driver.

The control unit can furthermore be configured, in reaction to it being determined that the driving function is to be activated or deactivated (at an upcoming activation or deactivation point in time), to cause a manual control intervention in the longitudinal and/or lateral control of the vehicle effectuated by the driver of the vehicle to be at least partially compensated and/or suppressed before the activation or deactivation point in time. In other words, it is possible to cause the effects of a manual control intervention of the driver, which takes place during the phase in which the driver is focusing on the activation or deactivation of the driving function, to be at least partially compensated and/or avoided.

In particular, the control unit can be designed to at least partially compensate and/or suppress a manual control intervention of the driver, by which a change, in particular a disadvantageous change, of the actual value of a driving variable is effectuated, in particular by which the actual value of the driving variable is moved away from the target value of the driving variable. This can in particular be effectuated for the one or more driving variables which are set, in particular regulated, by the driving function.

The control unit can thus be configured to adapt the driving behavior of the vehicle during the transition between the manual longitudinal and/or lateral control (by the driver) and the automated longitudinal and/or lateral control (by the driving function), in particular in such a way that one or more (in particular disadvantageous) effects of the manual control intervention of the driver are reduced and/or avoided. The comfort, the safety, and the efficiency of a vehicle upon the activation or the deactivation of a driving function can thus be increased.

The control unit can be configured to at least partially compensate and/or suppress the manual control intervention effectuated by the driver of the vehicle in the longitudinal and/or lateral control of the vehicle before the activation or deactivation point in time, in order to cause the (actual) value of at least one driving variable of the vehicle to remain within a target range or a target corridor (around the target value of the respective driving variable) during the transition between the manual longitudinal and/or lateral control and the automated longitudinal and/or lateral control. This can be effectuated in particular for the one or more driving variables which are set, in particular regulated, by the driving function.

Alternatively or additionally, the control unit can be configured to cause the (actual) value of a driving variable of the vehicle to deviate less from the target value of the driving variable during the transition between the manual longitudinal and/or lateral control and the automated longitudinal and/or lateral control, in particular at the activation or deactivation point in time, than if the manual control intervention were not at least partially compensated and/or suppressed. This can be effectuated in particular for the one or more driving variables which are set, in particular regulated, to the respective target value by the driving function.

Alternatively or additionally, the control unit can be configured to cause an overshoot or an undershoot of the (actual) value of a driving variable (from the target value of the driving variable) caused by the manual control intervention to be reduced (in particular in comparison to a situation in which the manual control intervention is not at least partially compensated and/or suppressed) during the transition between the manual longitudinal and/or lateral control and the automated longitudinal and/or lateral control. This can be effectuated in particular for the one or more driving variables which are set, in particular regulated, to the respective target value by the driving function.

By way of such a compensation and/or suppression of the manual control intervention, a particularly safe, efficient, and/or comfortable transition can be effectuated between the manual longitudinal and/or lateral control (of the driver) and the automated longitudinal and/or lateral control (of the driving function).

The control unit can be configured to ascertain sensor data from one or more sensors of the vehicle, wherein the sensor data comprise information with respect to an activity of the driver with respect to the activation or the deactivation of the driving function. The one or more sensors can comprise, for example, a proximity sensor for the operating element (for example, a button or a switch) for activating or for deactivating the driving function. Alternatively or additionally, the one or more sensors can comprise one or more upstream, required operating elements or operating steps for activating or for deactivating the driving function (for example, opening a software menu). Alternatively or additionally, the one or more sensors can comprise a camera which is configured to acquire image data with respect to the driver, in particular with respect to a hand of the driver.

The control unit can be configured to determine in a particularly precise manner on the basis of the sensor data that the driver of the vehicle is about to and/or intends to activate or deactivate the driving function. It can thus be recognized on the basis of the sensor data from one or more sensors of the vehicle particularly early before the activation or deactivation point in time that the driver is focused on the activation or the deactivation of the driving function (and as a result thereof possibly causes an incorrect manual control intervention).

The control unit can be configured to detect a manual control intervention in the longitudinal and/or lateral control of the vehicle at a control means of the vehicle. Exemplary control means of the vehicle are: a steering means, in particular a steering wheel or handlebars, of the vehicle; an accelerator pedal or a throttle grip of the vehicle; and/or a brake pedal or a brake lever of the vehicle. The manual intervention in the longitudinal and/or lateral control can thus be recognized in a particularly reliable manner.

The control unit can be configured to operate one or more longitudinal and/or lateral control actuators of the vehicle in order to at least partially compensate and/or suppress the manual control intervention in the longitudinal and/or lateral control of the vehicle. Exemplary longitudinal and/or lateral control actuators are: an (electrical) steering device of the vehicle; a drive motor of the vehicle; and/or a braking device of the vehicle. A manual intervention of the driver of the vehicle can thus be at least partially or completely compensated in a particularly reliable manner.

The control unit can be configured to ascertain the actual value of at least one driving variable during the (possibly entire) preparation time period. In particular the actual values of the one or more driving variables can be ascertained, which are set, in particular regulated, during operation of the driving function to be activated or to be deactivated. The preparation time period can extend from the first point in time, at which it is determined that the driver of the vehicle is about to and/or intends to activate or to deactivate the driving function, up to the activation or deactivation point in time. The actual values of the one or more driving variables can be ascertained on the basis of the sensor data from one or more vehicle sensors (for example a speed sensor) and/or environmental sensors.

The control unit can furthermore be configured to cause one or more automated interventions in the longitudinal and/or lateral control of the vehicle during the (entire) preparation time period, in dependence on the actual value and the target value of the at least one driving variable, in particular in dependence on the deviation of the actual value from the target value. The one or more automated interventions can be effectuated to cause the actual value of the driving variable to remain during the (entire) preparation time period within a specific target range around the target value. The target value and/or the target range can possibly be defined here by the driver of the vehicle.

The one or more automated interventions can take place to (at least partially) compensate a manual control intervention of the driver during the preparation time period. In one preferred example, the one or more automated interventions can be effectuated in such a way that the actual value of the driving variable remains during the (entire) preparation time period within the determined target range around the target value. Due to the effectuation of one or more automated interventions, a particularly comfortable, safe, and efficient transition can take place between the manual and the automated longitudinal and/or lateral control of the vehicle.

The control unit can be configured to effectuate the one or more automated interventions in the longitudinal and/or lateral control of the vehicle in dependence on a regulator function. The regulator function can indicate the intensity and/or the frequency of the one or more automated interventions as a function of the actual value of the driving variable, in particular as a function of the deviation of the actual value from the target value.

In one preferred example, the regulator function is such that the intensity and/or frequency indicated by the regulator function of the one or more automated interventions is less than a threshold value, in particular is equal to zero, if the actual value is within the target range. Alternatively or additionally, the regulator function can be such that the intensity and/or frequency indicated by the regulator function of the one or more automated interventions is greater than the threshold value (and in particular increases with rising deviation from the target range) if the actual value is outside the target range. In this case, for example, an exponential increase of the intensity and/or frequency of the one or more automated interventions can take place with rising distance of the actual value from the target range.

It can be ensured in a particularly reliable manner by the consideration of a (trough-shaped) regulator function when effectuating the one or more automated interventions that (even if one or more manual control interventions are present), the actual value of the driving variable remains during the entire preparation time period within the target range.

According to a further aspect, a (road) motor vehicle (in particular a passenger vehicle or a truck or a bus or a motorcycle) is described, which comprises the control unit described in this document.

According to a further aspect, a method for controlling a driving function of a vehicle is described, which is designed to longitudinally and/or laterally control the vehicle in an (at least partially) automated manner. The method comprises determining that the driver of the vehicle is about to and/or intends to activate the driving function, in order to effectuate an automated longitudinal and/or lateral control by the driving function starting from a manual longitudinal and/or lateral control of the vehicle by the driver from an activation point in time, or to deactivate the driving function, in order to manually longitudinally and/or laterally control the vehicle from a deactivation point in time of the driving function.

Furthermore, the method comprises, in reaction thereto, causing a manual control intervention effectuated by the driver of the vehicle in the longitudinal and/or lateral control of the vehicle before the activation or deactivation point in time to be at least partially compensated and/or suppressed, in particular to adapt the driving behavior of the vehicle during the transition between the manual longitudinal and/or lateral control and the automated longitudinal and/or lateral control (for example, to increase the continuity and/or the uniformity of the driving behavior).

According to a further aspect, a software (SW) program is described. The SW program can be configured to be executed on a processor (for example, on a control device of a vehicle), and to thus carry out the method described in this document.

According to a further aspect, a storage medium is described. The storage medium can comprise an SW program, which is configured to be executed on a processor, and to thus carry out the method described in this document.

The term "automated driving" can be understood in the scope of the document as driving having automated longitudinal or lateral control or automated driving having automated longitudinal and lateral control. Automated driving can involve, for example, driving over a longer time on the freeway or driving for a limited time in the context of parking or maneuvering. The term "automated driving" comprises automated driving with an arbitrary degree of automation. Exemplary degrees of automation are assisted, semiautomated, highly automated, or fully automated driving. These degrees of automation were defined by the Bundesanstalt für Straßenwesen [German Federal Highway Research Institute] (BASt) (see BASt publication "Forschung kompakt [compact research]", edition November 2012) and/or in the specification SAE J3016R. In assisted driving, the driver continuously executes the longitudinal or lateral control, while the system takes over the respective other function in certain limits. In semiautomated driving (TAF), the system takes over the longitudinal and lateral control for a certain period of time and/or in specific situations, wherein the driver has to continuously monitor the system as in assisted driving. In highly automated driving (HAF), the system takes over the longitudinal and lateral control for a certain period of time without the driver having to continuously monitor the system; however, the driver has to be capable of taking over the vehicle control in a certain time. In fully automated driving (VAF), the system can automatically manage the driving in all situations for a specific application; a driver is no longer necessary for this application. The above-mentioned four degrees of automation correspond to the SAE levels 1 to 4 of the norm SAE J3016 (SAE—Society of Automotive Engineering). For example, highly automated driving (HAF) corresponds to level 3 of the norm SAE J3016. Furthermore, the SAE level 5 is also provided as the highest degree of automation in SAE J3016, which is not included in the definition of the BASt. The SAE level 5 corresponds to the SAE level 4, but without restriction of the so-called operational driving domain.

It is to be noted that the methods, devices, and systems described in this document can be used both alone and also in combination with other methods, devices, and systems described in this document. Furthermore, any aspects of the methods, devices, and systems described in this document can be combined in manifold ways with one another. In particular, the features of the claims can be combined with one another in manifold ways.

The invention is described in more detail hereinafter on the basis of exemplary embodiments.

DETAILED DESCRIPTION OF THE DRAWINGS

Figure 1:
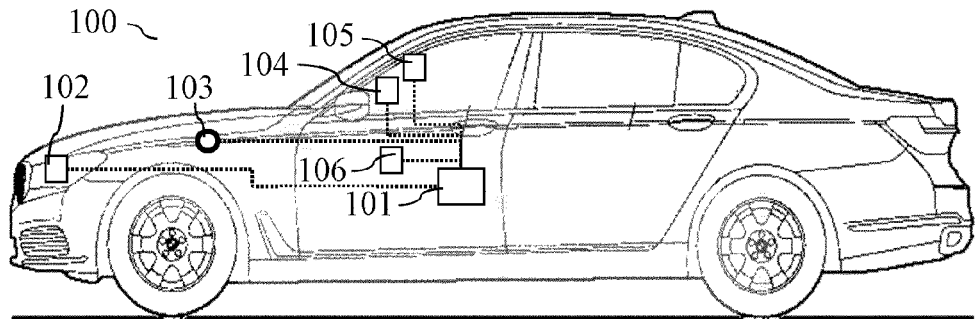
FIG. 1 shows exemplary components of a vehicle.

As described at the outset, the present document relates to increasing the comfort, the efficiency, and/or the safety during the activation and/or during the deactivation of a driving function of a vehicle 100. In this context, FIG. 1 shows exemplary components of a vehicle 100, which is designed to be longitudinally and/or laterally controlled manually by a driver of the vehicle 100, and which has a driving function for automated longitudinal and/or lateral control of the vehicle 100 (for example, according to SAE level 1 or higher).

The vehicle 100 comprises one or more control devices 106, which enable the driver of the vehicle 100 to manually longitudinally and/or laterally control the vehicle 100. Exemplary control devices 106 are: a steering device, in particular a steering wheel or handlebars; an accelerator pedal or a throttle grip; a brake pedal or a brake lever; and/or a gear selection lever. The one or more control devices 106 can be designed to act on the longitudinal and/or the lateral control of the vehicle 100 directly (for example via a mechanical coupling) or indirectly (for example via a control unit 101 of the vehicle 100).

The vehicle 100 furthermore comprises one or more surroundings sensors 102, which are designed to acquire surroundings data (i.e., sensor data) with respect to the surroundings of the vehicle 100. Exemplary surroundings sensors 102 are: a camera, a radar sensor, a lidar sensor, an ultrasonic sensor, etc. The control unit 101 of the vehicle 100 can be designed to operate one or more longitudinal and/or lateral control actuators 103 of the vehicle 100 on the basis of the surroundings data in order to provide a driving function for automated longitudinal and/or lateral control of the vehicle 100 (in particular a driver assistance function, such as ACC or a lane keeping assistant). Exemplary longitudinal and/or lateral control actuators 103 are an electrical steering device, a drive motor, and/or a braking device.

The driving function can be designed in such a way that the vehicle 100 is operated in the context of the driving function as a function of target values for one or more driving variables. Exemplary driving variables are:
the (longitudinal) driving speed of the vehicle 100;
the distance of the vehicle 100 to a front vehicle driving in front of the vehicle 100; and/or
the lateral position of the vehicle 100 within the lane traveled by the vehicle 100.

The driving function can in particular comprise a regulator, which is designed to regulate the actual value of at least one driving variable to a specific target value. The target value of the at least one driving variable can possibly be defined and/or specified here by the driver of the vehicle.

The vehicle 100 typically comprises at least one operating element 104, e.g., a button, a touch-sensitive display screen, and/or a switch, which enables the driver of the vehicle 100, starting from a manual driving mode, in which the vehicle 100 is longitudinally and/or laterally controlled manually by the driver, to activate the driving function for automated longitudinal and/or lateral control. Furthermore, the driver can possibly cause the driving function to be ended by actuating the operating element 104, in order to transfer the vehicle 100 into the manual driving mode.

The driver of the vehicle 100 can be at least temporarily distracted from the driving task for the manual longitudinal and/or lateral control of the vehicle 100 upon actuation of the operating element 104. In experiments, it was sometimes possible to observe that this temporary, increased cognitive strain can in particular have the result that the driver of the vehicle 100, in particular upon the activation of a driving function, causes an (in particular additional) deviation of the actual value of a driving variable from the target value of the driving variable. For example, it can be that the driver of the vehicle 100, in particular upon the activation of a driving function, temporarily takes their foot from the accelerator pedal, and thus causes the actual speed of the vehicle 100 to drop, and as a result to deviate relatively significantly from the target speed of the vehicle 100 during the operation of the driving function. In a further example, the actuation of the operating element 104 can have the result that the driver moves the vehicle 100 away from the center location within the presently traveled lane.

Figure 2:
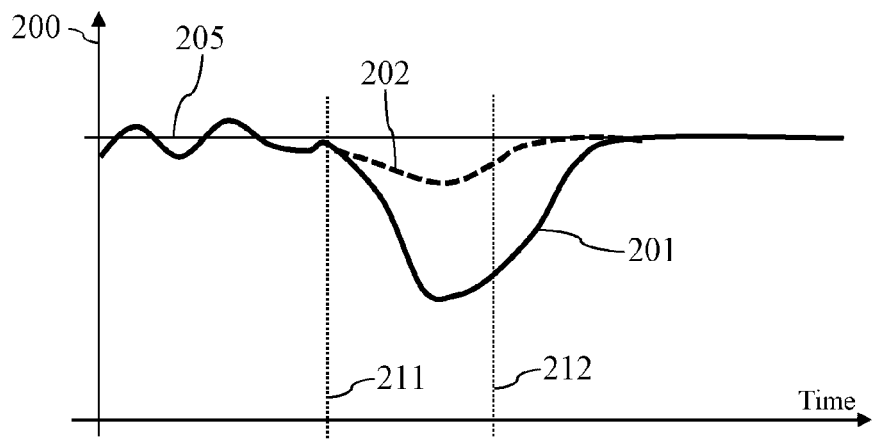
FIG. 2 shows exemplary time curves of a driving or regulating variable of a driving function of a vehicle.

FIG. 2 shows an exemplary time curve 201 of a driving variable 200 (for example, the driving speed or the transverse location of the vehicle 100) during the activation of a driving function. The driving function is activated at an activation point in time 212, at which the driver of the vehicle 100 actuates the operating element 104. The driving function can be designed to set the driving variable 200 to a specific target value 205, in particular to regulate it, in particular in such a way that the actual value of the driving variable 200 during operation of the driving function substantially corresponds to the target value 205.

Before the activation point in time 212, the vehicle 100 is manually longitudinally and/or laterally controlled by the driver of the vehicle 100. In particular, in this case the setting of the actual value of the driving variable 200 can be effectuated manually by the driver of the vehicle 100 (by manual control interventions at one or more control device 106). In particular in the case of a relatively stable traffic situation, it can be that the driver attempts to keep the actual value of the driving variable 200 approximately at the target value 205 (by acting on at least one control device 106).

After the driver of the vehicle 100 decides to activate the driving function, the driver of the vehicle 100 focuses within a specific preparation time period before the activation point in time 212 on the actuation of the operating element 201. In the example shown in FIG. 2, the preparation time period extends from the (preparation) point in time 211 to the activation point in time 212. Within the preparation time period, the driver of the vehicle 100, for example, temporarily observes the dashboard of the vehicle 100 to find the operating element 104 for activating the driving function, and/or to guide the hand to the operating element 104.

Therefore, within the preparation time period, the driver temporarily has to divide their cognitive resources between the primary driving task and operation of the driving system, which can increase the cognitive strain of the driver and which can have the result that (due to one or more manual control interventions of the driver of the vehicle 100), the actual values of one or more driving variables 200 deviate from the respective target values 205. This is shown by way of example in FIG. 2 by the time curve 201.

The deviation of the actual value of a driving variable 200 caused during the preparation time period from the target value 205 of the driving variable 200 has the result that the driving function at the activation point in time 212 causes a relatively strong change of the actual value of the driving variable 200 to set the actual value to the target value 205. This can be perceived by the driver of the vehicle 100 as uncomfortable.

The control unit 101 of the vehicle 100 can be configured to detect, even before the actual activation point in time 212 of a driving function, that the driver of the vehicle 100 wishes to activate the driving function or will activate the latter in the near future. For this purpose, the vehicle 100 can comprise one or more sensors 105, which are configured to acquire sensor data with respect to an upcoming actuation of the operating element 104 to activate or deactivate the driving function. Exemplary sensors 105 are:
a camera, which is designed to acquire image data with respect to the driver of the vehicle 100; and/or
a proximity sensor, which is designed to recognize that a hand of the driver of the vehicle 100 approaches the operating element 104.

The control unit 101 of the vehicle 100 can be configured to determine, in particular on the basis of the sensor data of the one or more sensors 105, at a first point in time (for example, directly at the preparation point in time 211 at which the driver of the vehicle 100 begins with the preparation of the actuation of the operating element 104) that the driver of the vehicle 100 will activate (or deactivate) the driving function. The first point in time is chronologically before the actual activation or deactivation point in time 212 of the driving function.

Furthermore, the control unit 101 can be configured to cause, from the first point in time, a deviation of the actual value of a driving variable 200 caused by the manual longitudinal and/or lateral control of the driver of the vehicle 100 from the target value 205 of the driving variable 200 to be at least partially compensated. For this purpose, the control unit 101 can be configured to effectuate automatic interventions of the one or more longitudinal and/or lateral control actuators 103. In particular, it is possible to cause here that at the actual activation point in time 212 of the driving function, the deviation between actual value and target value 205 of the driving variable 200 is less in absolute value than for the case in which no automatic interventions of the one or more longitudinal and/or lateral control actuators 103 are caused during the preparation time period.

FIG. 2 shows by way of example a time curve 202 (shown by dashed lines) of the actual value of a driving variable 200, which results within the preparation time period before the activation or deactivation point in time 212 of the driving function if one or more manual control interventions of the driver of the vehicle 100 are at least partially compensated. As is apparent from FIG. 2, by way of one or more compensating interventions in the longitudinal and/or lateral control of the vehicle 100, it is possible to cause the deviation between actual value and target value 205 of the driving variable 200 at the activation or deactivation point in time 212 of the driving function to be reduced, so that the level of comfort for the driver of the vehicle 100 upon the activation or the deactivation of the driving function can be increased.

Figure 4:
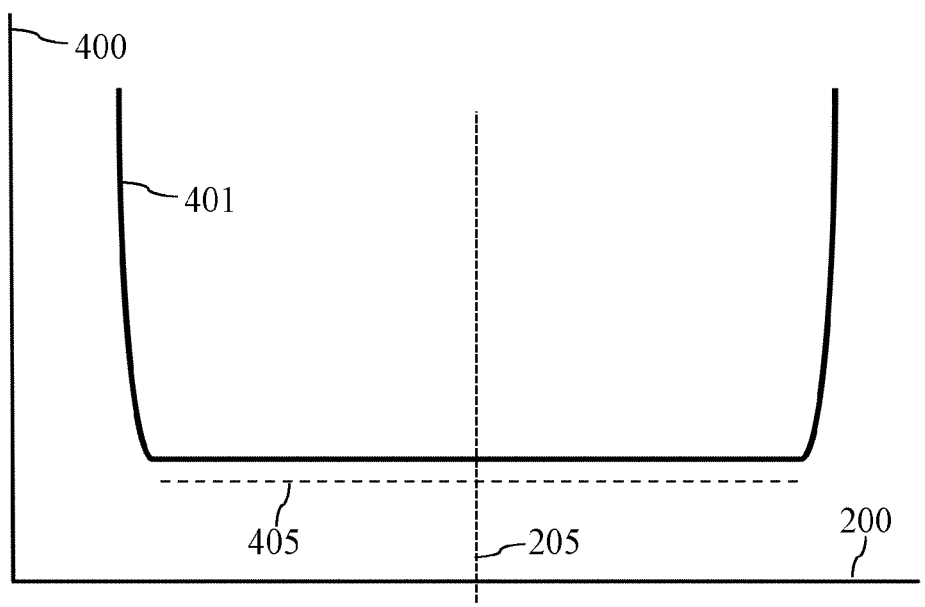
FIG. 4 shows an exemplary regulator function to compensate manual control interventions during the preparation time period for activating or for deactivating a driving function.

FIG. 4 shows an exemplary regulator function 401 for effectuating one or more compensating interventions in the longitudinal and/or lateral control of the vehicle 100 during the preparation time period before the activation or deactivation point in time 212 of the driving function. The regulator function 401 can be designed to cause the actual value of at least one driving variable 200 to remain during the preparation time period within a defined corridor or interval 405 around the target value 205 of the driving variable 200. The regulator function 401 can indicate the strength of the one or more compensating (regulator) interventions in the longitudinal and/or lateral control of the vehicle 100 as a function of the actual value of the driving variable 200, in particular as a function of the deviation of the actual value of the driving variable 200 from the target value 205 of the driving variable 200.

As shown by way of example in FIG. 4, the regulator function 401 can have a trough-shaped curve. In particular, the regulator function 401 can be such that (during the preparation time period) only relatively weak interventions or no interventions at all take place in the longitudinal and/or lateral control of the vehicle 100 as long as the actual value of the driving variable 200 remains within the target corridor 405. On the other hand, one or more relatively strong interventions in the longitudinal and/or lateral control of the vehicle 100 can be effectuated if (in particular as soon as) the actual value of the driving variable 200 is outside the target corridor 405. It can thus be reliably ensured that the actual value of the driving variable 200 (also upon the presence of a manual control intervention by the driver) at the activation or deactivation point in time 212 of the driving function is within the target corridor 405. A particularly safe, comfortable, and efficient transition between the manual and automated longitudinal and/or lateral control of the vehicle 100 can thus take place.

As already described above, it can be observed from observations of the usage behavior of drivers (in particular in the case of drivers having relatively little experience with the use of driver assistance systems) during the use of driver assistance systems that upon switching on and switching off of assistance systems, sometimes rough transitions between the driver and the assistance system take place during the transfer of the control of the longitudinal and/or lateral control of the vehicle 100. For example, drivers possibly (slightly) let up on the gas shortly before the activation of ACC, so that the vehicle 100 has to be decelerated by the engine drag torque and has to be accelerated again only after the ACC activation to reach the same speed as before the beginning of the process for activating ACC. Furthermore, it can be observed that the driver often carries out the steering less uniformly or accurately during the activation of a driver assistance system, so that the vehicle 100 has to be steered back into the lane center after the activation of the driver assistance system.

It can thus occur that the driver of a vehicle 100 is temporarily additionally cognitively stressed (in particular cognitively) during the activation or deactivation of a driving function. Alternatively or additionally, it can be that the driver of a vehicle 100 relies too much on the automated longitudinal and/or lateral control of a driving function. As a result, a relatively inharmonious transition between a manual driving mode and the driving function can take place.

In this document, an apparatus, a device, and/or a method are described in which via (vehicle-side) sensor system 105, the intent of a driver of a vehicle 100 to activate or to deactivate a driver assistance system can be detected. In reaction thereto, one or more measures can then be effectuated to alleviate or prevent entirely one or more undesired side effects due to the additional cognitive strain of the driver and/or due to a non-advantageous behavior of the driver and/or due to a negative interaction of the driver with the vehicle 100.

For example, in an ACC system, a (possibly trough-shaped) regulator can be provided (as shown by way of example in FIG. 4), which can always be applied to the ACC algorithm when the driver, in preparation for the activation of the ACC system, moves a finger or a hand toward the operating element 104 for activating the ACC system, or places a finger or a hand thereon. Such a preparatory activity for the activation of the ACC system can be recognized on the basis of an active proximity sensor 105 of the operating element 104. The regulator can be designed in such a way that an intervention is made in the vehicle control hardly to not at all around the "center location" or around the desired target state value 205 of one or more driving variables 200. Furthermore, the regulator can be designed in such a way that the regulator regulates more strongly the greater the negative or positive deviation of the actual value of the one or more driving variables 200 from the respective target value 205 is.

Within the preparation time period up to the actual activation (or deactivation) of the ACC system, via the electrical accelerator pedal of the vehicle 100, a "let off the gas" or an excessively strong "give gas" of the driver (which can be caused in particular upon deactivation of ACC) can be at least partially or completely compensated by the vehicle 100 or by the ACC algorithm. As a result, the control transition between driver and driving function can be carried out relatively smoothly and with increased safety and efficiency.

For a driving variable 200, a target value 205 or a target corridor can be defined. If the condition "intention of the driver to activate or deactivate a driving function recognized" is met, overshoots or undershoots of the actual value of the driving variable 200 (which are caused by one or more manual control inputs of the driver of the vehicle 100) within a certain range can be adapted in such a way that the most seamless possible transition to the target state of the vehicle 100 (in particular to the target values of the one or more driving variables 200) can take place.

Figure 3:
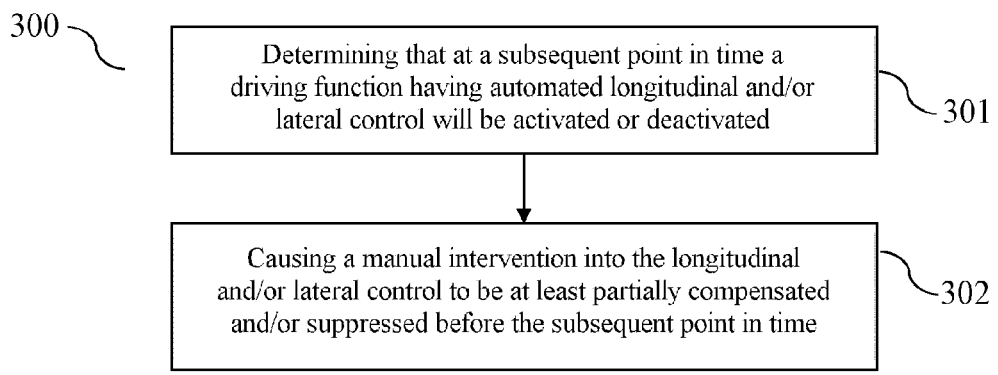
FIG. 3 is a flow chart of an exemplary method for operating a driving function of a vehicle.

FIG. 3 shows a flow chart of an exemplary (computer-implemented) method 300 for controlling a driving function, in particular a driver assistance function, of a vehicle 100. The driving function is designed to longitudinally and/or laterally control the vehicle 100 in an automated manner. Exemplary driving functions are ACC or a lane keeping assistant.

The method 300 comprises the determination 301 that the driver of the vehicle 100 is about to and/or intends to activate the driving function or deactivate the driving function. The driving function can be activated, for example, in order, starting from a manual longitudinal and/or lateral control of the vehicle 100 by the driver, to effectuate an automated longitudinal and/or lateral control by the driving function from the activation point in time 212 of the driving function. On the other hand, the driving function can be deactivated, for example, to enable the driver of the vehicle 100 to longitudinally and/or laterally control the vehicle 100 manually from the deactivation point in time 212 of the driving function. The activation point in time or the deactivation point in time 212 can correspond here to the point in time at which the driving function is effectively activated or deactivated by the driver (for example, at which the driver of the vehicle 100 actuates an operating element 104 to activate or deactivate the driving function).

It can thus be recognized, chronologically even before the actual activation point in time or deactivation point in time 212 (for example, on the basis of the sensor data of one or more sensors 105 of the vehicle 100), that the driving function is to be activated or deactivated (and that the driver of the vehicle 100 is possibly inclined due to the activation or deactivation process to effectuate an incorrect manual control intervention at a control means 106 of the vehicle 100).

The method 300 furthermore comprises, in reaction to the determination 301, causing 302 a manual control intervention effectuated by the driver of the vehicle 100 in the longitudinal and/or lateral control of the vehicle 100 to be at least partially compensated and/or suppressed before the activation or deactivation point in time 212. In other words, it is possible to cause a manual control intervention which takes place while the driver of the vehicle 100 is focused on the activation or the deactivation of the driving function to be at least partially compensated and/or suppressed. In particular, it is possible to cause an effect of the manual control intervention on the longitudinal and/or lateral control of the vehicle 100 to be reduced.

The method 300 can be designed to adapt the driving behavior of the vehicle 100 during the transition between the manual longitudinal and/or lateral control and the automated longitudinal and/or lateral control (which is effectuated by the activation or the deactivation of the driving function). In particular, the continuity and/or the uniformity of the driving behavior of the vehicle 100 during the transition can be increased.

Comfortable, efficient, and safe transitions between the manual longitudinal and/or lateral control by the driver and the automated longitudinal and/or lateral control by a driving function of a vehicle 100 can be effectuated by the measures described in this document. The comfort, the efficiency, and the safety of a vehicle 100 can thus be increased.

The present invention is not restricted to the exemplary embodiments shown. In particular, it is to be noted that the description and the figures are only to illustrate the principle of the proposed methods, devices, and systems by way of example.

The invention claimed is:

1. An apparatus for controlling a driving function of a vehicle, which driving function longitudinally and/or laterally controls the vehicle in an automated manner, comprising:
   a control unit operatively configured to:
   ascertain sensor data from one or more sensors of the vehicle, wherein the sensor data comprise information with respect to an activity of the driver with respect to an activation or a deactivation of the driving function;
   make a determination, based on the sensor data, before a driver of the vehicle provides a physical input to the vehicle to activate or deactivate the driving function, that the driver of the vehicle is about to and/or intends to:
   (i) activate the driving function in order to, starting from a manual longitudinal and/or lateral control of the vehicle by the driver, effectuate an automated longitudinal and/or lateral control by the driving function from an activation point in time of the driving function, or
   (ii) deactivate the driving function in order to longitudinally and/or laterally control the vehicle manually from a deactivation point in time of the driving function;
   at least partially compensate and/or suppress, in reaction to the determination, a manual control intervention effectuated by the driver of the vehicle in the longitudinal and/or lateral control of the vehicle before the activation or deactivation point in time in order to adapt a driving behavior of the vehicle during a transition between the manual longitudinal and/or lateral control and the automated longitudinal and/or lateral control,
   during a preparation time period, which extends from a first point in time, at which it is determined that the driver of the vehicle is about to and/or intends to activate or deactivate the driving function, to the activation or deactivation point in time:
   ascertain an actual value of a driving variable; and
   as a function of a deviation of the actual value from a target value of the driving variable, cause one or more automated interventions in the longitudinal and/or lateral control of the vehicle, in order to cause the actual value of the driving variable to remain within a target range around the target value during the preparation time period, and
   cause the one or more automated interventions in the longitudinal and/or lateral control of the vehicle as a function of a regulator function, wherein:

the regulator function indicates an intensity and/or a frequency of the one or more automated interventions as a function of the actual value of the driving variable, the regulator function is such that:
the intensity and/or frequency of the one or more automated interventions indicated by the regulator function is less than a threshold value if the actual value is within the target range, and
the intensity and/or frequency of the one or more automated interventions indicated by the regulator function is greater than the threshold value if the actual value is outside the target range, the one or more sensors comprise a proximity sensor for an operating element for activating or for deactivating the driving function, and the operating element comprises a button, a switch, and/or a touch-sensitive display screen.

2. The apparatus according to claim 1, wherein
the control unit is further configured to at least partially compensate and/or suppress the manual control intervention in the longitudinal and/or lateral control of the vehicle effectuated by the driver of the vehicle before the activation or deactivation point in time, in order to:
(i) cause a value of a driving variable of the vehicle to remain within a target range during the transition between the manual longitudinal and/or lateral control and automated longitudinal and/or lateral control;
(ii) cause the value of the driving variable of the vehicle to deviate less from a target value during the transition between the manual longitudinal and/or lateral control and the automated longitudinal and/or lateral control, at the activation or deactivation point in time, than if the manual control intervention were not at least partially compensated and/or suppressed; or
(iii) cause an overshoot or an undershoot of the value of the driving variable caused by the manual control intervention to be reduced during the transition between the manual longitudinal and/or lateral control and the automated longitudinal and/or lateral control.

3. The apparatus according to claim 2, wherein the driving variable comprises at least one of:
a driving speed of the vehicle;
a lateral location of the vehicle within a lane traveled by the vehicle; or
a distance of the vehicle to a front vehicle driving in front of the vehicle.

4. The apparatus according to claim 1, wherein
the one or more sensors further comprise a camera, which is configured to acquire image data with respect to the driver.

5. The apparatus according to claim 1, wherein
the control unit is configured to detect a manual control intervention in the longitudinal and/or lateral control of the vehicle at a control device of the vehicle; and
the control device comprises at least one of:
a steering wheel or handlebars of the vehicle,
an accelerator pedal or a throttle grip of the vehicle, or
a brake pedal or a brake lever of the vehicle.

6. The apparatus according to claim 1, wherein
the control unit is further configured to operate one or more longitudinal and/or lateral control actuators of the vehicle to at least partially compensate and/or suppress the manual control intervention in the longitudinal and/or lateral control of the vehicle; and
the one or more longitudinal and/or lateral control actuators comprise at least one of:
a steering device of the vehicle,
a drive motor of the vehicle, or
a braking device of the vehicle.

7. The apparatus according to claim 1, wherein
the driving function is designed to set a driving variable of the vehicle to a target value; and
the control unit is further configured to at least partially compensate and/or suppress a manual control intervention of the driver, by which a change of an actual value of the driving variable is effectuated.

8. The apparatus according to claim 1, wherein the driving function comprises at least one of:
a cruise control,
an adaptive cruise control, or
a lane keeping assistant.

9. The apparatus according to claim 1, wherein the regulator function indicates an intensity and/or a frequency of the one or more automated interventions as a function of the deviation of the actual value from the target value.

10. The apparatus according to claim 1, wherein the intensity and/or frequency of the one or more automated interventions indicated by the regulator function is zero if the actual value is within the target range.

11. A method for controlling a driving function of a vehicle, which driving function longitudinally and/or laterally controls the vehicle in an automated manner, the method comprising:
ascertaining sensor data from one or more sensors of the vehicle, wherein the sensor data comprise information with respect to an activity of the driver with respect to an activation or a deactivation of the driving function;
making a determination, based on the sensor data, before a driver of the vehicle provides a physical input to the vehicle to activate or deactivate the driving function, that the driver of the vehicle is about to and/or intends to:
(i) activate the driving function in order to, starting from a manual longitudinal and/or lateral control of the vehicle by the driver, effectuate an automated longitudinal and/or lateral control by the driving function from an activation point in time of the driving function, or
(ii) deactivate the driving function in order to longitudinally and/or laterally control the vehicle manually from a deactivation point in time of the driving function; and
at least partially compensating and/or suppressing, in reaction to the determination, a manual control intervention effectuated by the driver of the vehicle in the longitudinal and/or lateral control of the vehicle before the activation or deactivation point in time in order to adapt a driving behavior of the vehicle during a transition between the manual longitudinal and/or lateral control and the automated longitudinal and/or lateral control,
during a preparation time period, which extends from a first point in time, at which it is determined that the driver of the vehicle is about to and/or intends to activate or deactivate the driving function, to the activation or deactivation point in time:
ascertaining an actual value of a driving variable; and
as a function of a deviation of the actual value from a target value of the driving variable, causing one or more automated interventions in the longitudinal and/or lateral control of the vehicle, in order to cause the actual value of the driving variable to remain within a target range around the target value during the preparation time period, and causing the one or more automated interventions in the longitudinal and/or lateral control of the vehicle as a function of a regulator function, wherein:

the regulator function indicates an intensity and/or a frequency of the one or more automated interventions as a function of the actual value of the driving variable, the regulator function is such that:
- the intensity and/or frequency of the one or more automated interventions indicated by the regulator function is less than a threshold value if the actual value is within the target range, and
- the intensity and/or frequency of the one or more automated interventions indicated by the regulator function is greater than the threshold value if the actual value is outside the target range, the one or more sensors comprise a proximity sensor for an operating element for activating or for deactivating the driving function, and the operating element comprises a button, a switch, and/or a touch-sensitive display screen.

* * * * *